United States Patent [19]

Matsuura et al.

[11] Patent Number: 4,972,034
[45] Date of Patent: Nov. 20, 1990

[54] CATALYSTS FOR THE POLYMERIZATION OF OLEFINS

[75] Inventors: Mitsuyuki Matsuura; Takashi Fujita, both of Yokkaichi, Japan

[73] Assignee: Mitsubishi Petrochemical Company Limited, Tokyo, Japan

[21] Appl. No.: 387,788

[22] Filed: Aug. 1, 1989

Related U.S. Application Data

[62] Division of Ser. No. 177,478, Apr. 1, 1988, Pat. No. 4,870,043.

[30] Foreign Application Priority Data

Apr. 3, 1987 [JP] Japan .................................. 62-82425
May 8, 1987 [JP] Japan .................................. 62-111775

[51] Int. Cl.⁵ .............................................. C08F 4/646
[52] U.S. Cl. ...................................... 526/125; 526/124; 526/128; 526/351; 502/116
[58] Field of Search ...................... 526/125, 128, 124

[56] References Cited

U.S. PATENT DOCUMENTS 4,335,016 6/1982 Dombro .......................... 526/128 X
4,451,688 5/1984 Kuroda et al. .................. 526/125 X Primary Examiner—Patrick P. Garvin
Attorney, Agent, or Firm—Oblon, Spivak, McClelland, Maier & Neustadt

[57] ABSTRACT

A catalyst for the polymerization of olefins comprising a combination of a solid catalyst component (A) comprising a solid catalytic complex (i) containing titanium, magnesium and a halogen as the essential ingredients with an organoaluminium compound (B), wherein said solid catalyst component (A) is obtained by bringing the following ingredients (ii) and (iii) in contact with said solid catalytic complex (i):

Ingredient (ii): a silicon compound represented by the general formula:

$$R_m^1 X_n Si(OR^2)_{4-m-n}$$

wherein $R^1$ and $R^2$ each stand for a hydrocarbyl residue, X denotes a halogen, and m and n are such that $0 \leq m \leq 3$ and $0 \leq n \leq 3$ are satisfied on condition that $0 \leq m+n \leq 3$, and Ingredient (iii): an organometallic compound selected from the group consisting of organozinc compounds and organomagnesium compounds. The catalyst makes it possible to eliminate what is called "outside electron donor" as a component for making up a final catalyst system.

2 Claims, No Drawings

CATALYSTS FOR THE POLYMERIZATION OF OLEFINS

This is a division of application Ser. No. 07/177,478, filed on Apr. 1, 1988 and now U.S. Pat. No. 4,870,043.

BACKGROUND OF THE INVENTION

1. Field of the Invention

The present invention relates to catalysts for the polymerization of olefins. More particularly, the present invention is concerned with the application of a specific catalyst to the polymerization of α-olefins having three or more carbon atoms, thereby making it possible to producing highly stereoregular polymers under stable polymerization conditions and with industrial advantages.

Although the catalysts heretofore proposed for the polymerization of olefins comprising a solid catalyst component containing titanium, magnesium and a halogen as the essential ingredients and an orgaroaluminium have shown extremely high activity, yet it has been necessary to use an electron donative compound (electron donor) during polymerization, when the high stereoregularity of polymer products is desired.

However, problems with such catalysts using the electron donative compound as the third component (external donor) are that difficulties are encountered in the control of the performance of polymer products inclusive of the regulation of their molecular weight for reasons that the velocity of polymerization drops due to the reaction of the organoaluminium compound with the electron donative compound; when the polymerization temperature is elevated so as to increase the velocity of polymerization, said reaction is so accelerated that an attempt to increase the yield (or productivity) of polymers by doing so is subject to restriction, and other reasons.

Therefore, it is now desired to develop catalyst systems which overcome the aforesaid problems and make it possible to produce highly stereoregular polymers with improved catalytic yields but without using any electron donative compound as the third component (what is called "external electron donor").

2. Prior Art

Japanese Patent Laid-Open Publication No. 58(1983)-138715 discloses a process for carrying out polymerization with a catalyst system free from any external electron donor, which is composed of a solid component obtained by permitting (1) a titanium composite containing as the essential ingredients tetravalent titanium, magnesium, a halogen and an electron donor to react with (2) an organosilicon compound in the presence of an organoaluminium compound, or treating said titanium composite with an organoaluminium compound and, thereafter, permitting it to react with said organosilicon compound; and an organoaluminium compound.

However, it is found that such a proposal shows some signs of improvement in connection with the solving of the aforesaid problems, but there is still left much to be improved for reasons that: limitation is imposed upon the performance of the obtained polymer products; the catalyst deteriorates with time; restriction is placed upon the quantitative ratio of the titanium component and organoaluminium compound used at the time of polymerization; and other reasons.

SUMMARY OF THE INVENTION

A primary object of the present invention is to provide a solution to the problems described above. More specifically, according to the present invention, this object is achieved by the provision of a catalyst for the polymerization of olefins which comprises the following components (A) and (B).

Component (A)

Solid catalyst component obtained by bringing the following ingredients (i), (ii) and (iii) into contact: Ingredient (i): a solid catalytic complex containing titanium, magnesium and a halogen as the essential ingredients; Ingredient (ii): a silicon compound represented by the general formula:

$$R^1_m X_n Si(OR^2)_{4-m-n}$$

wherein $R^1$ and $R^2$ each are a hydrocarbyl residue, X is a halogen atom, and m and n are such that $0 \leq m \leq 3$ and $0 \leq n \leq 3$ are satisfied on condition that $0 \leq m+n \leq 3$; and Ingredient (iii): an organometallic compound selected from the group consisting of organozinc compounds and organomagnesium compounds.

Component (B)

Organoaluminium compound

The catalysts for the polymerization of olefins according to the present invention do not rely upon the need of any electron donative compound (external electron donor) at the time of polymerization, and can solve the problems of the prior art catalyst since no problem arises even at elevated polymerization temperatures because the velocity of polymerization is prevented from dropping.

These features are of great advantage in industrial production, and are of importance to catalysts. Although not yet adequately clarified, the reasons why such catalysts are obtained are considered to be due to the interaction between the silicon compound for the ingredient (ii) and the organometallic compound for the ingredient (iii), both used in the present invention.

It is another advantage inherent in the present invention that the use of catalyst according to the present invention makes it easier to control the density of polymer produced. For instance, polypropylenes of desired density (within a certain range) can be produced contrary to the most of catalysts known heretofore.

It is still another advantage inherent to the present invention that the use of the catalyst of the present invention produces propylene polymers with less amount of atactic polypropylenes contrary to the most of catalysts known heretofore. Prior catalysts have a tendency such that lower the density of polymer produced is, higher the quantity of atactic polypropylene will be whereby stable production of stereospecific propylene polymers with the least quantity of atactic polypropylene is liable to be impaired.

DETAILED DESCRIPTION OF THE INVENTION

Catalyst

The catalysts of the present invention comprise the specific components (A) and (B). It is to be noted that the verb "comprise" does not imply that the components to be used are limited to those referred to viz., (A)

and (B). Nor does it exclude the coexistence of a pertinent third component.

Component (A)

The component (A) of the catalysts according to the present invention is a solid catalyst component obtained by allowing the aforesaid ingredients (i) to (iii) to come into contact with one another in a single step or in any successive steps. It is to be noted that the wording "obtained by . . . in contact with" does not imply that the ingredients for contacting are limited to those referred to, viz., (1) to (iii). Nor does it exclude the coexistence of a pertinent fourth ingredient.

Ingredient (i)

The solid catalyst complexes used for the ingredient (i) and containing titanium, magnesium and a halogen as the essential ingredients are known in the art. The catalytic complexes used to this end are, by way of example, referred to in Japanese Patent Laid-Open Publication Nos. 53(1978)-45688, 54(1979)-3894, 54-31092, 54-39483, 54-45696, 54-94591, 54-118484, 54-131589, 55(1980)-75411, 55-90510, 55-90511, 55-127405, 55-147507, 55-155003, 56(1981)-18609, 56-86905, 56-70005, 56-72001, 56-86905, 56-90807, 56-98206, 56-155206 57(1982)-3803, 57-34103, 57-92007, 57-121003, 58(1983)-5309, 58-5310, 58-5811, 58-8706, 58-27732, 58-32604, 58-32605, 58-67703, 58-117206, 58-127708, 58-183708, 58-183709, 59(1984)-149905 and 59-149906.

Examples of the magnesium compounds which are to be used in the present invention and provide a magnesium source for the catalytic complex are magnesium halides, dialkoxymagnesiums, alkoxymagnesium halides, magnesium oxyhalides, dialkylmagnesiums, magnesium oxide, magnesium hydroxide, and carboxylates of magnesium. Magnesium dihalides are preferable, magnesium dichloride being more preferable.

The titanium compounds providing a titanium source for the catalytic complex include those represented by the general formula:

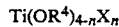

$$Ti(OR^4)_{4-n}X_n$$

wherein $R^4$ is a hydrocarbyl residue which has preferably about 1 to 10 carbon atoms, X stands for a halogen atom, and n denotes a number satisfying $0 \leq n \leq 4$. Specific examples may include $TiCl_4$, $TiBr_4$, $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-nC_4H_9)Cl_3$, $Ti(O-nC_4H_9)_2Cl_2$, $Ti(OC_2H_5)Br_3$, $Ti(OC_2H_5)(OC_4H_9)_2Cl$, $Ti(O-nC_4H_9)_3Cl$, $Ti(O-C_6H_5)Cl_3$, $Ti(O-iC_4H_9)_2Cl_2$, $Ti(OC_5H_{11})Cl_3$, $Ti(OC_6H_{13})Cl_3$, $Ti(OC_2H_5)_4$, $Ti(O-nC_3H_7)_4$, $Ti(O-nC_4H_9)_4$, $Ti(O-iC_4H_9)_4$, $Ti(O-nC_6H_{13})_4$, $Ti(O-nC_8H_{17})_4$ and $Ti[OCH_2CH(C_2O_5)C_4H_9]_4$. $TiCl_4$ and $Ti(O-nC_4H_9)_4$ are preferable.

Use may also be made of molecular compounds obtained by permitting the electron donors to be described later to react with $TiX'_4$ wherein $X'$ denotes a halogen atom. Specific examples of such compound; may include $TiCl_4.CH_3COC_2H_5$, $TiCl_4.CH_3CO_2C_2H_5$, $TiCl_4.C_6H_5NO_2$, $TiCl_4.CH_3COCl$, $TiCl_4.C_6H_5COCl$, $TiCl_4.C_6H_5CO_2C_2H_5$, $TiCl_4.ClCOC_2H_5$ and $TiCl_4.C_4H_4O$.

The halogen source for the catalytic complex is ordinarily one of the aforesaid halogen compounds of magnesium and/or of titanium, but may be replaced by known halogenating agents such as halides of aluminium, of silicon and of phosphorus.

The halogen contained in the catalyst component may be fluorine, chlorine, bromine or iodine or a mixture thereof. However, particular preference is given to chlorine.

In addition to the aforesaid essential ingredients, the solid catalytic complex (i) according to the present invention can also contain as an additional ingredient a silicon compound such as $SiCl_4$, $CH_3SiCl_3$ or methyl hydrogen polysiloxane; an aluminium compound such as $Al(OiC_3H_8)_3$, $AlCl_3$, $AlBr_3$, $Al(OC_2H_5)_3$ or $Al(OCH_3)_2Cl$, and/or a boron compound such as $B(OCH_3)_3$, $B(OC_2H_5)_3$ or $B(OC_6H_5)_3$. These compounds may remain in the solid component in the form of the components for silicon, aluminium, boron and so on.

Further, the solid catalytic complex (i) can also be prepared by using an electron donor as what is called "internal electron donor".

Examples of electron donors usable as the internal electron donors for the preparation of the solid catalytic complex are oxygenated electron donors such as alcohols, phenols, ketones, aldehydes, carboxylic acids, esters of organic or inorganic acids, ethers, acid amides and acid anhydrides, and nitrogenated electron donors such as ammonia, amines, nitriles and isocyanates.

More specifically, examples of usable electron donors are (a) alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzyl alcohol; (b) phenols which have 6 to 25 carbon atoms and may optionally contain an alkyl group such as phenol, cresol, xylenol, ethyl phenol, propyl phenol, cumyl phenol, nonyl phenol and naphthol; (c) etones having 3 to 15 carbon atoms such as acetone, methyl ethyl ketone, ethyl isobutyl ketone, acetophenone and benzophenone; (d) aldehydes having 2 to 15 carbon atoms such as acetaldehyde, propionaldehyde, octylaldehyde, benzaldehyde, tolualdehyde and naphthoaldehyde; (e) organic acid esters having 2 to 20 carbon atoms such as methyl formate, methyl acetate, ethyl acetate, vinyl acetate, propyl acetate, octyl acetate, cyclohexyl acetate, ethyl propionate, methyl outyrate, ethyl valerate, ethyl stearate, methyl chlcroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butylolactone, α-valerolactone, cumarin, phthalide, ethylene carbonate, cellosolve acetate, methylcellosolve acetate, n-butylcellosolve acetate, cellosolve isobutyrate and cellosolve benzoate; (f) inorganic acid esters such as ethyl silicate, butyl silicate and pheny triethoxysilane; (g) acid halides having 2 to 15 carbon atoms such as acetyl chloride, benzoyl chloride, trluoyl chloride, anisoyl chloride, phthaloyl chloride and isophthaloyl chloride; (h) ethers having 2 to 20 carbon atoms such as methyl ether, ethyl ether, isopropyl ether, butyl ether, amyl ether tetrahydrofuran, anisole and diphenyl ether; (i) amides such as acetamide, benzamide and toluamide; (j) amines such as monomethylamine, monoethylamine, diethylamine, tributylamine, piperidine, tribenzylamine, aniline, pyridine, picoline and tetramethylethylenediamine; and (k) nitriles such as acetonitrile, benzonitrile and tolunitrile. These electron donors can be used in combination if so desired. Of these, preference is given to organic acid esters and acid halides, and particular preference is given to phthalic esters and phthaloyl halides.

The amounts of the aforesaid ingredients to be used are not restricted as long as the objects of the present invention are achievable. In general, however, they are preferably within the following ranges.

The amount of the titanium compound to be used is preferably in a range of, in molar ratio, $1 \times 10^{-4}$ to 1,000, more preferably 0.01 to 10 with respect to the amount of the magnesium compound to be used. When a halogen compound is used intended solely as the halogen source, its amount is preferably in a range of, in molar ratio, $1 \times 10^{-2}$ to 1,000, more preferably 0.1 to 100 with respect to the amount of the magnesium compound to be used, irrespectively of whether the magnesium compound and/or the titanium compound contains the halogen atom or not. The amounts of the silicon, aluminium and boron compounds to be used are preferably in a range of, in molar ratio, $1 \times 10^{-3}$ to 1,000, more preferably 0.01 to 100 with respect to the magnesium compound to be used.

The amount of the electron donative, compound to be used on the electron donor is preferably in a range of, in molar ratio, $1 \times 10^{-3}$ to 10, more preferably 0.01 to 5 with respect to the magnesium compound to be used.

With the use of the aforesaid titanium, magnesium and halogen compounds as the titanium, magnesium and halogen sources and, if required, other ingredients such as electron donors, the solid catalytic complex (i) is prepared in the following manner, by way of example.

(a) The magnesium compound is brought in contact with the electron donor as shown, for instance, in the aforesaid Japanese Patent Laid-Open Publication No. 58-117206;

(b) Alumina or magnesia is treated with a phosphorus halide compound, and is then brought in contact with the magnesium halide, the electron donor and the halogen-containing titanium compound as shown, for instance, in the aforesaid Japanese Patent Laid-Open Publication No. 56-98206;

(c) The magnesium halide is brought in contact with the titanium tetraalkoxide and a specific polymeric silicon compound to obtain a solid product, which is then permitted to come into contact wit the halogen-containing titanium compound and/or the halogen compound of silicon as shown, for instance, in the aforesaid Japanese Patent Laid-Open Publication Nos. 58-5309 and 58-5311.

For the polymeric silicon compound, a compound represented by the following formula is suitable.

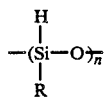

wherein R stands for a hydrocarbyl residue having about 1 to 10 carbon atoms, and n denotes the degree of polymerization that permits the viscosity of the polymeric silicon compound to be in a range of about 1 to 100 centistokes.

Of these polymeric silicon compounds, particular preference is given to methylhydrogenpolysiloxane, 1,3,5,7-tetramethylcyclotetrasiloxane and 1,3,5,7,9-pentamethylcyclopentasiloxane;

(d) The magnesium compound is dissolved in the titanium tetraalkoxide and the electron donor, and is then precipitated by addition to the solution of a halogenating agent or a titanium halogen compound to form a solid product, which is then brought into contact with the titanium compound as shown, for instance, in the aforesaid Japanese Patent Laid-Open Publication No. 58-32605;

(e) The halogenating agent and/or the titanium compound is/are brought in contact with the alkoxymagnesium compound in the presence or absence of the electron donor as shown, for instance, in the aforesaid Japanese Patent Laid-Open Publication No. 54-45696.

Ingredient (ii)

The ingredient (ii) used for the preparation of the component (A) is a silicon compound represented by the general formula:

wherein $R^1$ and $R^2$ each are a hydrocarbyl residue, X is a halogen atom, and m and n are such that $0 \leq m \leq 3$ and $0 \leq n \leq 3$ are satisfied on condition that $0 \leq m+n \leq 3$. Preferably, each of $R^1$ and $R^2$ is a hydrocarbyl residue having about 1 to 20, particularly 1 to 10 carbon atoms. X is preferably chlorine atom at least for economical consideration.

Specific examples of such silicon compounds may include: $(CH_3)Si(OCH_3)_3$, $(CH_3)Si(OC_2H_5)_3$, $(C_2H_5)_2Si(OCH_3)_2$, $(n\text{-}C_6H_{11})Si(OCH_3)_3$, $(C_2H_5)Si(OC_2H_5)_3$, $(n\text{-}C_{10}H_{21})Si(OC_2H_5)_3$, $(CH_2=CH)Si(OCH_3)_3$, $Cl(CH_2)_3Si(OCH_3)_3$, $Si(OCH_3)_4$, $Si(OC_2H_5)_3Cl$, $(C_2H_5)_2Si(OC_2H_5)_2$, $(C_{17}H_{35})Si(OCH_3)_3$, $Si(OC_2H_5)_4$, $(C_6H_5)Si(OCH_3)_3$, $Si(OCH_3)_2Cl_2$, $(C_6H_5)_2Si(OCH_3)_2$, $(C_6H_5)(CH_3)Si(OCH_3)_2$, $C_6H_5Si(OC_2H_5)_3$, $(C_6H_5)_2Si(OC_2H_5)_2$, $NC(CH_2(_2Si(OC_2H_5(_3$, $(C_6H_5)(CH_3)Si(OC_2H_5)_2$, $(n\text{-}C_3H_7)Si(OC_2H_5)_3$, $(CH_3)Si(OC_3H_7)_3$, $(C_6H_5)(CH_2)Si(OC_2H_5)_3$,

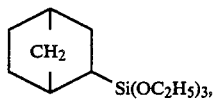

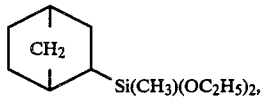

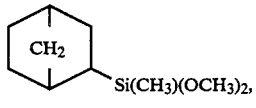

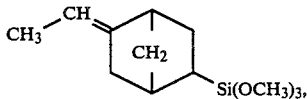

$(CH_3)_3CSi(CH_3)(OCH_3)_2$, $(CH_3)_3CSi(HC(CH_3)_2)(OCH_3)_2$, $(CH_3)_3CSi(CH_3)(OC_2H_5)_2$, $(C_2H_5)_3CSi(CH_3)(OCH_3)_2$, $(CH_3)(C_2H_5)CHSi(CH_3)(OCH_3)_2$, $((CH_3)_2CHCH_2)Si(OCH_3)_2$, $C_2H_5C(CH_3)_2Si(CH_3)(OCH_3)_2$, $C_2H_5C(CH_3)_2Si(CH_3$-

)(OC$_2$H$_5$)$_2$, (CH$_3$)$_3$CSi(OCH$_3$)$_3$, (CH$_3$)$_3$CSi(OC$_2$H$_5$)$_3$, (C$_2$H$_5$)$_3$, (C$_2$H$_5$)$_3$C-Si(OC$_2$H$_5$)$_3$, and (CH$_3$)(C$_2$H$_5$)CHSi(OCH$_3$)$_3$.

In particular, preference is given to a silicon compound wherein R$^1$ is a branched-chain hydrocarbyl residue having 3 to 20 carbon atoms with the carbon at its α-position being secondary or tertiary, inter alia, a branched-chain hydrocarbyl residue having 4 to 10 carbon atoms with the carbon at its α-position being tertiary. More preferable are (t-C$_4$H$_9$)(CH$_3$)Si(OCH$_3$)$_2$, (t-C$_4$H$_9$)(CH$_3$)Si(OC$_2$H$_5$)$_2$, (t-C$_4$H$_9$)Si(OCH$_3$)$_3$ and (t-C$_4$H$_9$)Si(OC$_2$H$_5$)$_3$.

Ingredient (iii)

One group of the ingredient (iii) used for the preparation of the component (A) is an organozinc compound, which may be superior to the organomagnesium compound that is another group of the ingredient (iii).

An organozinc compound represented by the following general formula is suitable.

$$R^3{}_{2-a}ZnX_a$$

wherein R$^3$ stands for a hydrocarbyl residue having 1 to 20 carbon atoms, X denotes a halogen atom or an alkoxide group, and a is a number satisfying 0≦a≦2. R$^3$ has preferably about 1 to 10 carbon atoms. The alkyl moiety of the alkoxide group has preferably about 1 to 6 carbon atoms. The halogen is preferably chlorine at least for economical consideration.

Specific examples of such compounds may include (CH$_3$)$_2$Zn, (C$_2$H$_5$)$_2$Zn, (i-C$_4$H$_9$9)$_2$Zn, (n-C$_8$H$_{17}$)$_2$Zn, (C$_2$H$_5$)ZnCl, (n-C$_4$H$_9$)ZnCl, (CH$_3$)Zn(OC$_2$H$_5$) and (C$_2$H$_5$)Zn(OCH$_3$). (C$_2$H$_5$)$_2$Zn is preferable.

The other group of the ingredient (iii) used for the preparation of the component (A) is an organomagnesium compound, for which a compound represented by the following general formula is suitable.

$$R^3{}_{2-a}MgX_a$$

wherein R$^3$ stands for a hydrocarbyl residue having 1 to 20, preferably 1 to 10 carbon atoms, X denotes a halogen atom, and a indicates a number satisfying 0≦a≦2. The halogen is preferably chlorine at least for economical consideration.

Specific examples of such compounds may include (C$_2$H$_5$)MgCl, (nC$_3$H$_8$)MgCl, (nC$_4$H$_9$)MgCl, (iC$_5$H$_{11}$)MgCl, (C$_6$H$_5$)MgCl, (nC$_4$H$_9$)MgBr, (C$_2$H$_5$)MgI, (C$_2$H$_5$)$_2$Mg, (nC$_3$H$_8$)$_2$Mg, (nC$_4$H$_9$)$_2$Mg, (nC$_6$H$_{11}$)$_2$Mg, (C$_2$H$_5$)(nC$_4$H$_9$)Mg and (C$_6$H$_5$)$_2$Mg.

Ingredient (iv), optional

The component (A) can comprise an optional component, ingredient (iv), so that the advantages inherent in the present invention may further be obtained. The ingredient (iv) is a titanium compound of a formula: Ti(OR)$_{4-n}$X$_n$ wherein R is a hydrocarbyl residue preferably having 1 to 10 carbon atoms, X is a halogen atom, and n is a number satisfying a formula 0≦n≦4. Examples of such a titanium compound include: TiCl$_4$, TiBr$_4$, Ti(OC$_2$H$_5$)Cl$_3$, Ti(OC$_2$H$_5$)$_2$Cl$_2$, Ti(OC$_2$H$_5$)$_3$Cl, Ti(O-iC$_3$H$_5$)Cl$_3$, Ti(O-nC$_4$H$_9$)Cl$_3$, Ti(O-nC$_4$H$_9$)$_2$Cl$_2$, Ti(OC$_2$H$_5$)Br$_3$, Ti(OC$_2$H$_5$)(OC$_4$H$_9$)$_2$Cl, Ti(O-nC$_4$H$_9$)$_3$Cl, Ti(O-C$_6$H$_5$)Cl$_3$, Ti(O-iC$_4$H$_9$)$_2$Cl$_2$, Ti(OC$_5$H$_{11}$)Cl$_3$ and Ti(OC$_6$H$_{13}$)CL$_{13}$. TiCl$_4$ is preferable.

Preparation of Component (A)

The aforesaid ingredients (i) to (iii) may be brought into contact with one another in a single step or in any successive steps under any suitable conditions, as long as the objects of the present invention are achievable, but in general the following contact conditions are preferred. The contact temperature is in a range of −50° to 200° C., preferably 0° to 100° C. The ingredients may be brought in contact with one another at once or stepwise by mechanical means using a rotary ball mill, a vibration mill, a jet mill and a medium-stirring triturator, or by stirring means in the presence of an inert diluent. Aliphatic or aromatic hydrocarbons and halohydrocarbons as well as polysiloxanes (for instance, the polymeric silicon compounds as already mentioned) may be used as the inert diluents for that purpose.

The quantitative ratio of the ingredients (i) to (iii) may be selected from any ranges, as long as the objects of the present invention are achievable but, in general, is preferably in the following ranges. The quantitative ratio between the ingredients (i) and (ii) is in a range of 0.01 to 1,000, preferably 0.1 to 100 in terms of the atomic ratio of the silicon of the ingredient (ii) to the titanium ingredient forming the ingredient (i) (silicon/titanium). The quantity of the ingredient (iii) to be used is preferably in a range of 0.01 to 100, particularly 0.1 to 30 in terms of the atomic ratio of the zinc of the ingredient (iii) to the titanium ingredient forming the ingredient (i) (zinc/titanium) or 0.01 to 100, preferably 0.1 to 20 in terms of atomic ratio of Mg/Ti. When the optional ingredient (iv) is used, the atomic ratio of Ti(iv)/Ti(i) is 0.01 to 100, preferably 0.1 to 20 , wherein Ti(i) and Ti(iv) means Ti atoms in ingredients (i) and (iv), respectively.

Component (B)

The component (B) is an organoaluminium compound. Preferable organoaluminium compounds are those represented by:

$$R^5{}_{3-n}AlX_n \text{ or } R^6{}_{3-m}Al(OR^{\&})_m$$

wherein R$^5$ and R$^6$ may be different or identical and stand for a hydrocarbyl residue having about 1to 20 , preferably 1 to 10 carbon atoms or a hydrogen atom, R$^7$ denotes a hydrocarbyl residue, X indicates a halogen atom, and n and m are a number satisfying 0≦n≦3 and 0≦m≦3, respectively. Specific examples of such compounds may include (a) trialkylaluminiums such as trimethylaluminium, triethylaluminium, triisobutylaluminium, trihexylaluminium, trioctylaluminium and tridecylaluminium; (b) alkylaluminium halides such as diethylaluminium monochloride, diisobutylaluminium monochloride, ethylaluminium sesquichloride and ethylaluminium dichloride; (c) dialkylaluminium hydrides such as diethylaluminium hydride and diisobutylaluminium hydride; and (d) aluminium alkoxides such as diethylaluminium ethoxide and diethylaluminium phenoxide.

Together with these organoaluminium compounds (a) to (d), use may be made of other organoaluminium compounds, for instance, an alkylaluminium alkoxide represented by:

$$R^8{}_{3-a}Al(OR^9)_a$$

wherein $1 \leq a \leq 3$ is Satisfied, and $R^8$ and $R^9$ may be different or identical and stand for an hydrocarbyl residue having about 1 to 20 carbon atoms. By way of example, use may be made of combinations of triethylaluminium with diethylaluminium ethoxide; diethylaluminium monochloride with diethylaluminium ethoxide; ethylaluminium dichloride with ethylaluminium diethoxide; and triethylaluminium with diethylaluminium chloride.

The amount of the component (B) to be used is in a range of 0.1 to 1,000, preferably 1 to 100, as expressed in terms of the weight ratio of the component (B) to (A).

Use of Catalyst/Polymerization

Not only are the catalysts of the present invention applicable to ordinary slurry polymerization but they may also be used for liquid-phase, solventless polymerization wherein substantially no solvent is used, solution polymerization and vapor-phase polymerization. The catalysts in accordance with the present invention can be used not only in continuous polymerization and batchwise polymerization but also in the polymerization wherein a preliminary polymerization is conducted : n which a small amount of an α-olefin is polymerized by the catalyst. In the case of slurry polymerization, aliphatic or aromatic hydrocarbons such as hexane, heptane, pentane, cyclohexane, benzene and toluene are used alone or in combination as the polymerization solvent. The polymerization temperature is from room temperature to about 200° C., preferably from 50° to 150° C., and hydrogen can be used additionally as the molecular-weight regulator.

The olefins to be polymerized with the catalyst systems of the present invention are represented by the general formula:

$$R-CH=CH_2$$

wherein R is a hydrogen atom or a hydrocarbyl residue which has 1 to 10 carbon atoms and may contain a branched group.

Specific examples of such olefins may include ethylene, propylene, butene-1, pentene-1, hexene-1 and 1,4-methylpentene. Preference is given to ethylene and propylene. In polymerization, ethylene can be copolymerized with the aforesaid olefin in an amount of up to 50 weight %, preferably up to 20 weight % based on ethylene, and propylene with the aforesaid olefin, particularly ethylene, in an amount of up to 30 weight % based on propylene. For such copolymerization, other copolymerizable monomers (e.g., vinyl acetate, diolefins, etc.) can also be used.

EXPERIMENTAL EXAMPLES

EXAMPLE 1a

Preparation of Component (A)

Forty (40) stainless steel balls of 12 mm diameter were loaded into a 0.4-liter ball mill which had been amply dried and internally replaced by nitrogen, and in which 20 g of $MgCl_2$ and 15.5 ml of diheptyl phthalate were introduced for a 48-hour rotary ball milling. Upon completion of this ball milling, the triturated composition was removed from within the mill in a dry box. Subsequently, 8.8 g of the triturated product was introduced into a flask which had been amply replaced internally by nitrogen, and 25 ml of n-heptane and 25 ml of $TiCl_4$ where further admitted into the flask wherein reaction took place at 100° C. for 3 hours. After completion of the reaction, the reaction product was fully washed with n-heptane. Compositional analysis of a part of the obtained solid product —Ingredient (i) —indicated that the Ti content was 3.01 weight %.

Next, 50 ml of sufficiently refined n-heptane were introduced into a flask which had been amply replaced internally by nitrogen. Subsequently 5 g of the ingredient (i) obtained as above 1.2 ml of $(CH_3)_3CSi(CH_3)(OCH_3)_2$ for the ingredient (ii) and 0.4 g of $Zn(C_2H_5)_2$ for the ingredient (iii) were admitted thereinto for a 2-hour contact at 30° C. After the completion of this contact, the product was thoroughly washed with n-heptane to obtain the component (A).

Polymerization of Propylene

Five hundred (500) ml of n-heptane, amply dehydrated and deoxygenated, 125 mg of triethylaluminium for the component (B) and 15 mg of the catalyst component (A) synthesized as above were introduced into a stainless steel autoclave of 1.5-liter internal volume equipped with a stirrer and a temperature controller. Then, 60 ml of $H_2$ were admitted, while the temperature and pressure of the autoclave were increased, to carry out polymerization under the conditions of a polymerization pressure of 5 kg/cm$^2$G, a polymerization temperature of 75° C. and a polymerization time of 2 hours. After the poymerization had been completed, the polymer obtained in a slurry was separated by filtration, which was followed by drying.

As a result, 88.7 g of the polymer were obtained. Additionally, 0.58 g of the polymer was obtained from the filtrate. Extraction testing in boiling heptane revealed that the total product's I.I (hereinafter referred simply to as T-I.I) was 97.2 weight %. MFR was 3.9 g/10 min., and the bulk density of the polymer was 0.41 g/cc.

EXAMPLE 2a

Preparation of Component (A)

Two hundred (200) ml of dehydrated and deoxygenated n-heptane were introduced into a flask which had been amply replaced internally by nitrogen, and 0.1 mole of $MgCl_2$ and 0.2 mole of $Ti(O-nC_4H_9)_4$ were then admitted thereinto for a 2-hour reaction at 95° C. After completion of the reaction, the temperature was decreased to 40° C., and 12 ml of methylhydropolysiloxane of 20 centistokes in viscosity was then introduced into the flask for a 3-hour reaction. The this formed solid product was washed with n-heptane. Subsequently, 50 ml of n-heptane purified as mentioned above was introduced into a flask which had been amply replaced internally by nitrogen, and 0.03 mole, calculated as atomic Mg, of the solid product synthesized as above was admitted thereinto. Then, a mixture of 25 ml of n-heptane with 0.05 mole of $SiCl_4$ was admitted into the flask at 30° C. over 30 minutes for a 3-hour reaction at 70° C. After completion of the reaction, the reaction product was washed with n-heptane. Subsequently, a mixture of 25 ml of n-heptane with 0.003 mole of phthalic chloride was introduced into the flask at 70° C. over 30 minutes for a one-hour reaction at 95° C. After completion of the reaction, the reaction product was washed with n-heptane. Subsequently, 5 ml of $TiCl_4$ was introduced into the flask for a six-hour reaction at 100° C. After completion of the reaction, the reaction product was thoroughly washed with n-heptane. The titanium content of the product was 2.45 weight %.

This was the ingredient (i) for the preparation of the solid component (A).

With this ingredient (i), contacting was carried out under conditions similar to those in Example 1a except that the amount of $(CH_3)_3CSi(CH_3)(OCH_3)_2$ used was changed to 1.6 ml. After completion of this contacting, the product was thoroughly washed with n-heptane to obtain the component (A).

Polymerization of Propylene

Propylene was polymerized under conditions similar to those applied for the polymerization of propylene in Example 1a except that the amount of triethylaluminum used as the component (B) was changed to 150 mg.

As a result, the polymer was obtained in a yield of 172 g, and found to have an MFR of 2.8 g/10 min., a T-I.I of 98.5 weight % and a bulk density of 0.48 g/cc.

EXAMPLE 3a to 6a

Catalysts were prepared as described in connection with the preparation of the component (A) in Example 2a except that in place of $(CH_3)_3CSi(CH_3)(OCH_3)_2$, the compounds specified in Table 1a were used as the silicon compounds for the ingredient (ii), and propylene was polymerized as described in Example 2a. The results are given in Table 1a.

Polymerization was carried out as described in connection with the polymerization of propylene in Example 3a except that the organoaluminium compounds shown in Table 2a were used for the organoaluminium compounds employed as the component (B) in Example 3a. The results are set forth in Table 2a.

EXAMPLE 10a

Preparation of Component (A)

One hundred (100) ml of dehydrated and deoxygenated n-heptane was introduced into a flask which had been amply replaced internally by nitrogen, :nd 0.1 mole of $MgCl_2$ and 0.2 mole of $Ti(O-nC_4H_9)_4$ were then admitted thereinto for a 2-hour reaction at 95° C. After completion of the reaction, the temperature was decreased to 35° C., and 15 ml of 1,3,5,7-tetramethylcyclotetrasiloxane were then introduced into the flask for a 5-hour reaction. The thus formed solid ingredient was washed with n-heptane. Subsequently, 50 ml of n-heptane was introduced into a flask which had been amply replaced internally by nitrogen, and 0.03 mole, calculated as atomic Mg, of the solid ingredient synthesized as above was admitted thereinto. Then, 0.06 mole of $SiCl_4$ was admitted into the flask at 20° C. over 30 minutes for a 3-hour reaction at 50° C. After completion of the reaction, the reaction product war washed with n-heptane to obtain the solid ingredient (i) for the preparation of the component (A). This solid ingredient had a titanium content of 4.52 weight %.

Subsequently, 50 ml of amply refined n-heptane was introduced into a flask which had been amply replaced internally by nitrogen, into which 5 g of the ingredient (i) obtained as above and, then, 1.5 g of $Zn(iC_4H_9)_4$ for the ingredient (iii) were admitted, thereby bringing these ingredients into contact with each other at 30° C. for 1 hour. After completion of the contact, the product was thoroughly washed with n-heptane. Then, 4.7 ml of $(CH_3)CSi(CH_3)(OCH_3)_2$ was introduced into the flask as the ingredient (ii) to permit it to come into contact with that product at 40° C. for 1hour. After completion of the contact, the product was thoroughly washed with n-heptane to obtain the component (A).

Polymerization of Propylene

Propylene was polymerized as descried in connection with the polymerization of propylene in Example 2a except that the amount of triethylaluminium used as the component (B) was changed to 63 mg, and a polymerization temperature of 70° C. was applied. The polymer was obtained in an amount of 109 g, and found to have an MFR of 8.6 g/10 min., a T-I.I of 96.2 weight % and a bulk specific weight of 0.46 g/cc.

EXAMPLE 11a

The component (A) was prepared under similar conditions as described in connection with the preparation of the component (A) in Example 2a except that ethyl benzoate was used for phthalic chloride. Propylene was also polymerized similarly as in Example 2a. As a result, the polymer was obtained in an amount of 77.8 g and found to have an MFR of 6.3 g/10 min., a TI.I of 93.3 weight % and a bulk density of 0.4 g/cc.

EXAMPLE 12a

The component (A) was prepared similarly as described in connection with the preparation of the component (A) in Example 1a except that 1.8 ml of $(CH_3)_3CSi(CH_3)(OCH_3)_2$ and 0.47 g of $Zn(C_2H_5)Cl$ were introduced as the ingredients (ii) and (iii), respectively, and the reagents were brought into contact at 50° C. for 1 hour. The polymerization of propylene was carried out in the same way. The polymer was obtained in an amount of 80.4 g and found to have an MFR of 4.3 g/10 min., a T-I.I of 6.6 weight % and a bulk density of 0.42 g/cc.

EXAMPLES 13a to 16a

Catalysts were prepared similarly as described in connection with the preparation of the component (A) in Example 2a except that the compounds sown in Table 3a were used as the silicon compounds of the ingredient (ii), and propylene was polymerized similarly as described in Example 2a. The results are set forth in Table 3a.

COMPARISON EXAMPLES 1a and 2a

The component (A) was prepared as described in connection with the preparation of the components (A) in Examples 1a and 2a except that $Zn(C_2H_5)_2$ was not used as the ingredient (iii), and propylene was polymerized in the same manner. The results are given in Table 4a.

COMPARISON EXAMPLE b 3a

The component (A) was prepared as described in connection with the preparation of the component (A) in Example 2a but without the ingredients (ii) and (iii), and propylene was polymerized in the same manner. The polymer was obtained in an amount of 118 g and found to have an MFR of 30.6 g/10 min., a bulk density of 0.32 g/cc and a T-I.I of 68.9 weight %.

TABLE 1a

| Examples | Silicon Compounds [Ingredient (ii)] | Yield of Polymer (g) | MFR (g/10 min.) | Bulk Density of Polymer (g/cc) | T-I.I (wt. %) |
|---|---|---|---|---|---|
| 3a | $(CH_3)_3CSi(OCH_3)_3$ | 136 | 3.8 | 0.46 | 97.5 |
| 4a | $(CH_3)_3CSi(OC_2H_5)_3$ | 141 | 4.1 | 0.46 | 97.8 |
| 5a | $(CH_3)_3CSi(CH_3)_2OCH_3$ | 152 | 5.3 | 0.45 | 96.9 |
| 6a | $Ph-C(CH_3)_2Si(OC_2H_5)_3$* | 127 | 4.7 | 0.46 | 97.1 |

*Ph = Phenyl

TABLE 2a

| Examples | Organoaluminium [Component (B)] | | Yield of Polymer (g) | MFR (g/10 min.) | Bulk Density of Polymer (g/cc) | T-I.I (wt. %) |
|---|---|---|---|---|---|---|
| 7a | Triisobutylaluminium | 217 mg | 124 | 3.9 | 0.45 | 97.4 |
| 8a | Trihexylaluminium | 322 mg | 119 | 4.3 | 0.46 | 97.0 |
| 9a | Triethylaluminium | 75 mg | 146 | 3.5 | 0.45 | 97.3 |
|  | Diethylaluminium Chloride | 25 mg |  |  |  |  |

TABLE 3a

| Examples | Silicon Compounds [Ingredient (ii)] | Yield of Polymer (g) | MFR (g/10 min.) | Bulk Density of Polymer (g/cc) | T-I.I (wt. %) |
|---|---|---|---|---|---|
| 13a | $(C_6H_5)_2Si(OCH_3)_2$ | 116 | 12.7 | 0.39 | 91.3 |
| 14a | $(CH_3)Si(OC_2H_5)_3$ | 87 | 16.8 | 0.37 | 81.6 |
| 15a | $(C_6H_5)Si(OC_2H_5)_3$ | 99 | 32.7 | 0.40 | 89.9 |
| 16a | $(C_6H_{11})Si(OCH_3)_3$ | 113 | 25.3 | 0.39 | 88.7 |

TABLE 4a

| Comparison Examples | Yield of Polymer (g) | MFR (g/10 min.) | Bulk Density of Polymer (g/cc) | T-I.I (wt. %) |
|---|---|---|---|---|
| 1a | 76.6 | 11.6 | 0.39 | 94.8 |
| 2a | 131 | 7.0 | 0.45 | 96.9 |

EXAMPLE 17a

Preparation of Component (A)

Two hundred (200) ml of dehydrated and deoxygenated n-heptane were introduced into a flask which had been amply replaced internally by nitrogen, and 0.4 mole of $MgCl_2$ and 0.8 mole of $Ti(O-nC_4H_9)_4$ were then admitted thereinto for a 2-hour reaction at 95° C. After completion of the reaction, the temperature was decreased to 40° C., and 48 ml of methylhydropolysiloxane of 20 centistokes in viscosity was then introduced into the flask for a 3-hour reaction. The thus formed solid product was washed with n-heptane. Subsequently, 50 ml of n-heptane purified as already mentioned was introduced into a flask which had been amply replaced internally by nitrogen, and 0.24 mole, calculated as atomic Mg, of the solid ingredient synthesized as above was admitted thereinto. Then, a mixture of 25 ml of n-heptane with 0.4 mole of $SiCl_4$ was admitted into the flask at 30° C. over 30 minutes for a 3-hour reaction at 70° C. After completion of the reaction, the react on product was washed with n-heptane. Subsequently, a mixture of 25 ml of n-heptane with 0.024 mole of phthalic chloride was introduced into the flask at 70° C. over 30 minutes for a one-hour reaction at 95° C. After completion of the reaction, the reaction product was washed with n-heptane. Subsequently, 20 ml of $SiCl_4$ was introduced into the flask for a six-hour reaction at 80° C. After completion of the reaction, the reaction product was thoroughly washed with n-heptane. The titanium content of the product was 1.21 weight %.

Fifty (50) g of purified n-heptane was introduced into a flask the inside of which had been replaced by nitrogen, and 5 g of the ingredient (i) produced in the above, then 0.45 ml of $(CH_3)_3CSi(CH_3)(OCH_3)$ as the ingredient (ii), then 0.43 ml of $TiCl_4$ as the optional ingredient were introduced and then 1.1 g of diethylzinc as the ingredient (iii) were introduced for a 2-hour contact at 30° C. After completion of the contact, the product was amply washed with n-heptane to produce the component (A).

Polymerization of Propylene

Five hundred (500) ml of n-heptane, amply dehydrated and deoxygenated, 125 mg of triethylaluminium for the component (B) and 15 mg of the catalyst component (A) synthesized as above were introduced into a stainless steel autoclave of 1.5-liter internal volume equipped with a stirrer and a temperature controller. Then, 60 ml of $H_2$ were admitted, while the temperature and pressure of the autoclave were increased, to carry out polymerization under the conditions of a polymerization pressure of 5 kg/cm²G, a polymerization temperature of 75° C. and a polymerization time of 2 hours. After the polymerization had been completed, the obtained polymer in a slurry was separated by filtration, which was followed by drying.

As a result, 223.6 g of the polymer were obtained. Additionally, 0.056 g of the polymer were obtained from the filtrate. Extraction testing in boiling heptane revealed that the total product's I.I (hereinafter referred simply to as T-I.I was 98.9 weight %. MFR was 1.9 g/10 min., and the bulk density of the polymer was 0.48 g/cc.

EXAMPLE 1b

Preparation of Component (A)

Forty (40) stainless-steel balls of 12 mm diameter were loaded into a 0.4-liter ball mill thoroughly dried and internally replaced by nitrogen, into which 20 g of $MgCl_2$ and 15.5 ml of diheptyl phthalate were introduced for a 48-hour rotary ball milling. Upon completion of this ball milling, the triturated mixed composition was removed from within the mill in a dry box. Subsequently, 8.8 g of the triturated product was introduced into a flask amply replaced internally by nitrogen, and 25 ml of n-heptane and 25 ml of $TiCl_4$ were further admitted into the flask wherein reaction took place at 100° C. for 3 hours. After completion of the reaction, the reaction product was thoroughly washed with n-heptane. Compositional analysis of a part of the obtained solid product —Ingredient (i) —indicated that the Ti content was 3.0 weight %

Next, 50 ml of amply refined n-heptane was introduced into a flask amply replaced internally by nitrogen. Afterwards, 5 g of the ingredient (i) obtained as above and, then, 1.2 ml of $(CH_3)_3CSi(CH_3)(OCH_3)_2$ for the ingredient (ii) and 0.99 g of $Mg((C_2H_5)(n-C_4H_9)$ for the ingredient (iii) were admitted thereinto for a 2-hour contacting at 30° C. After completion of this contacting, the product was thoroughly washed with n-heptane to obtain the component (A).

Polymerization of Propylene

Five hundred (500) ml of n-heptane, amply dehydrated and deoxygenated, 125 mg of triethylaluminium for the component (B) and 15 mg of the catalyst component (A) synthesized as above were introduced into a stainless-steel autoclave of 1.5-liter internal volume equipped with a stirrer and a temperature controller. Then, 60 ml of $H_2$ was admitted, while the temperature and pressure of the autoclave were increased, to carry out polymerization under the conditions of a polymerization pressure of 5 $kg/cm^2G$, a polymerization temperature of 75° C., and a polymerization time of 2 hours. After the polymerization had been completed, the obtained polymer slurry was separated by filtration, which was followed by drying.

As a result, 77.4 g of the polymer was obtained. Additionally, 0.8 g of the polymer was obtained from the filtrate. Extraction testing in boiling heptane revealed that the total product's I.I (hereinafter referred simply to as T-I.I) was 97.1 weight %. MFR was 4.6 g/10 min., and the bulk density of the polymer was 0.40 g/cc.

EXAMPLE 2b

Preparation of Component (A)

Two hundred (200) ml of dehydrated and deoxygenated n-heptane was introduced into a flask amply replaced internally by nitrogen, and 0.1 mole cf $MgCl_2$ and 0.2 mole of $Ti(O-nC_4H_9)_4$ were then admitted thereinto for a 2-hour reaction at 95° C. After completion of the reaction, the temperature was decreased to 40° C., and 12 ml of methylhydropolysiloxane of 20 centistokes in viscosity was then introduced into the flask for a 3-hour reaction. The formed solid product was washed with n-heptane. Subsequently, 50 ml of n-heptane purified as already mentioned was introduced into a flask amply replaced internally by nitrogen, and 0.03 mole, calculated as atomic Mg, of the solid product synthesized as above was admitted thereinto. Then, a mixture of 25 ml of n-heptane with 0.05 mole of $SiCl_4$ as admitted into the flask at 30° C. over 30 minutes for a 3-hour reaction at 70° C. After completion of the reaction, the reaction product was washed with n-heptane. Subsequently, a mixture of 25 ml of n-heptane with 0.003 mole of phthalic chloride was introduced into the flask at 70° C. over 30 minutes for a one-hour reaction at 95° C. After completion of the reaction, the react on product was washed with n-heptane. Subsequently, 5 ml of $TiCl_4$ was introduced into the flask for a six-hour reaction at 100° C. After completion of the reaction, the reaction product was thoroughly washed with n-heptane. The titanium content of this product was 2.4 weight %. This was the ingredient (i) for the preparation of the solid component (A).

With this ingredient (i), contacting was carried out under conditions similar to those in Example 1b except that the amount of $(CH_3)_3CSi(CH_3)(OCH_3)_2$ used was changed to 1.6 ml. After completion of this contacting, the product was thoroughly washed with n-heptane to obtain the component (A).

Polymerization of Propylene

Propylene was polymerized under conditions similar to those applied for the polymerization of propylene in Example 1b except that the amount of triethylaluminium used as the component (B) was changed to 150 mg.

As a result, the polymer was obtained in an amount of 146 g, and found to have an MFR of 3.2 g/10 min., a TI.I of 97.9 weight % and a bulk density of 0.48 g/cc.

EXAMPLES 3b to 6b

Catalysts were prepared similarly as described in connection with the preparation of the component (A) in Example 2b except that, in place of $(CH_3)_3CSi(CH_3)(OCH_3)_2$, the compounds specified in Table 1b were used as the silicon compounds for the ingredient (ii), and propylene was polymerized similarly as described in Example 2b. The results are given in Table 1b.

EXAMPLES 7b to 9b

Polymerization was carried out similarly as described in connection with the polymerization of propylene in Example 3b except that the organoaluminium compounds shown in Table 2b were used for the organoaluminium compounds employed as the component (B) in Example 3b. The results are shown in Table 2b.

EXAMPLE 10b

Preparation of Component (A)

One hundred (100) ml of dehydrated and deoxygenated n-heptane was introduced into a flask amply replaced internally by nitrogen, and 0.1 mole of $MgCl_2$ and 0.2 2-hour reaction at 95° C. After completion of the reaction, the temperature was decreased to 35° C., and 15 ml of 1,3,5,7-tetramethylcyclotetrasiloxane was then introduced into the flask for a 5-hour reaction. The thus formed solid product was washed with n-heptane. Subsequently, 50 ml of n-heptane was introduced into a flask amply replaced internally by nitrogen, and 0.03 mole, calculated as atomic Mg, of the solid product synthesized as above was admitted thereinto. Then, 0.06 mole of $SiCl_4$ was admitted into the flask at 20° C. over 30 minutes for a 3-hour reaction at 50° C. After completion of the reaction, the reaction product was washed with n-heptane to obtain the solid catalytic complex (i) for the preparation of the component (A). This solid catalytic complex had a titanium content of 4.52 weight %.

Next, 50 ml of amply refined n-heptane was introduced into a flask amply replaced internally by nitrogen, into which 5 g of the ingredient (i) obtained as above and, then, 1.8 g of $Mg(nC_6H_{13})_2$ for the ingredient (iii) were admitted, thereby bringing these ingredients into contact with one another at 30° C. for 1 hour. After completion of the contact, the product was thoroughly washed with n-heptane. Then, 4.7 ml of $(CH_3)CSi(CH_3)(OCH_3)_2$ was introduced in the flask as the ingredient (ii) to permit it to come into contact with the product at 40° C. for 1 hour. After the completion of the contact, the product was thoroughly washed with n-heptane to obtain the component (A).

Polymerization of Propylene

Propylene was polymerized similarly as described in connection with the polymerization of propylene in Example 2b except that the amount of triethylaluminium used as the component (B) was changed to 63 mg, and a polymerization temperature of 70° C. was applied. The polymer was obtained in an amount of 95 g, and found to have an MFR of 8.9 g/10 min., a T-I.I of 95.6 weight % and a bulk density of 0.46 g/cc.

EXAMPLE 11b

The component (A) was prepared under similar conditions as described in connection with the preparation of the component (A) in Example 2b except that ethyl benzoate was used in place of phthalic chloride. Propylene was polymerized in a similar manner as described in Example 2b. As a result, the polymer was obtained in an amount of 70.8 g, and found to have an MFR of 6.9 g/10 min., a T-I.I of 93.0 weight % and a bulk density of 0.41 g/cc.

EXAMPLE 12b

The component (A) was prepared as described in connection with the preparation of the component (A) in Example 1b except that 1.8 ml of $(CH_3)_3CSi(CH_3)(OCH_3)_2$ and 0.52 g of $Mg(C_4H_9)Cl$ were introduced as the ingredients (ii) and (iii), respectively, and the reagents were brought into contact with each other at 50° C. for 1 hour. The polymerization of propylene was carried out in the same way. The polymer was obtained in an amount of 71.5 g and found to have an MFR of 5.7 g/10 min., a T-I.I of 95.3 weight % and a bulk density of 0.41 g/cc.

EXAMPLES 13b to 16b

Catalysts were prepared similarly as described in connection with the preparation of the component (A) in Example 2b except that the compounds shown in Table 3b were used as the silicon compounds for the ingredient (ii), and propylene was polymerized similarly as in Example 2b. The results are shown in Table 3b.

EXAMPLE 17b

In a manner similar to that described in Example 2b, $MgCl_2$, $Ti(O-nC_4H_9)_4$ and methylhydrogenpolysiloxane were permitted to react with one another to synthesize a solid component, which was then introduced into a thoroughly purified flask in an amount of 0.03 mole, calculated as atomic Mg. Then, a mixture of 25 ml of n-heptane with 0.05 mole of $SiCl_4$ was introduced into the flask at 30° C. over 1 hour for a 4-hour reaction at 90° C. After completion of the reaction, the reaction product was washed with n-heptane. Subsequently, a mixture of 25 ml of n-heptane with 0.0027 mole of phthalic chloride was admitted into the flask at 70° C. over 30 minutes for a 1-hour reaction at 95° C. After completion of the reaction, the reaction product was thoroughly washed with n-heptane. The titanium content was 1.78 weight %. This product was the ingredient (i) for the preparation of the solid component (A).

With this ingredient (i), contacting was carried out under similar conditions as described in Example 1b except that the amount of $(CH_3)_3CSi(CH_3)(OCH_3)_2$ used was changed to 1.2 ml. After the completion of this contacting, the product was thoroughly washed with n-heptane to obtain the component (A).

Polymerization of Propylene

Propylene was polymerized under the conditions as described in Example 2b except that polymerization temperature of 85° C. was applied. The polymer was obtained in an amount of 153 g and found to have an MFR of 4.3 g/10 min., a T-I.I of 98.2 weight % and a bulk density of 0.44 g/cc.

COMPARISON EXAMPLES 1b and 2b

The components (A) were prepared as described in connection with the preparation of the components (A) in Examples 1b and 2b except that $Mg(C_2H_5)(C_4H_9)$ was not used as the ingredient (iii), and propylene was polymerized in the same manner. The results are given in Table 4b.

COMPARISON EXAMPLE 3b

The component (A) was prepared similarly as described in connection with the preparation of the component (A) in Example 2b but without the ingredients (ii) and (iii), and propylene was polymerized in the same manner. The polymer was obtained in an amount of 118 g and found to have an MFR of 30.6 g/10 min., a bulk density of 0.32 g/cc and a T-I.I of 68.9 weight %.

TABLE 1b

| Examples | Silicon Compounds [Ingredient (ii)] | Yield of Polymer (g) | MFR (g/10 min.) | Bulk Density of Polymer (g/cc) | T-I.I (wt. %) |
|---|---|---|---|---|---|
| 3b | $(CH_3)_3CSi(OCH_3)_3$ | 129 | 4.0 | 0.46 | 97.2 |
| 4b | $(CH_3)_3CSi(OC_2H_5)_3$ | 138 | 4.3 | 0.46 | 97.1 |
| 5b | $(CH_3)_3CSi(CH_3)_2OCH_3$ | 145 | 5.6 | 0.44 | 96.5 |
| 6b | $Ph\text{-}C(CH_3)_2Si(OC_2H_5)_3$* | 133 | 4.9 | 0.44 | 96.6 |

*Ph = Phenyl

TABLE 2b

| Examples | Organoaluminium [Component (B)] | | Yield of Polymer (g) | MFR (g/10 min.) | Bulk Density of Polymer (g/cc) | T-I.I (wt. %) |
|---|---|---|---|---|---|---|
| 7b | Triisobutylaluminium | 217 mg | 121 | 4.6 | 0.45 | 97.2 |
| 8b | Trihexylaluminium | 322 mg | 116 | 3.9 | 0.44 | 96.9 |
| 9b | Triethylaluminium<br>Diethylaluminium Chloride | 75 mg<br>25 mg | 143 | 3.7 | 0.43 | 97.2 |

TABLE 3b

| Examples | Silicon Compounds [Ingredient (ii)] | Yield of Polymer (g) | MFR (g/10 min.) | Bulk Density of Polymer (g/cc) | T-I.I (wt. %) |
|---|---|---|---|---|---|
| 13b | $(C_6H_5)_2Si(OCH_3)_2$ | 111 | 13.6 | 0.38 | 90.7 |
| 14b | $(CH_3)Si(OC_2H_5)_3$ | 83 | 17.9 | 0.37 | 80.7 |
| 15b | $(C_6H_5)Si(OC_2H_5)_3$ | 96 | 30.9 | 0.39 | 88.6 |
| 16b | $(C_6H_{11})Si(OCH_3)_3$ | 109 | 26.4 | 0.38 | 86.4 |

TABLE 4b

| Comparison Examples | Yield of Polymer (g) | MFR (g/10 min.) | Bulk Density of Polymer (g/cc) | T-I.I. (wt. %) |
|---|---|---|---|---|
| 1b | 76.6 | 11.6 | 0.39 | 94.8 |
| 2b | 131 | 7.0 | 0.45 | 96.9 |

EXAMPLE 18b

Preparation of Component (A)

One hundred (100) ml of dehydrated and deoxygenated n-heptane were introduced into a flask which had been amply replaced internally by nitrogen, and 0.1 mole of $MgCl_2$ and 0.2 mole of $Ti(O-nC_4H_9)_4$ were then admitted thereinto for a 2-hour reaction at 95° C. After completion of the reaction, the temperature was decreased to 35° C., and 15 ml of 1,3,5,7-tetramethylcyclotetrasiloxane was then introduced into the flask for a 5-hour reaction. The thus formed solid ingredient was washed with n-heptane. Subsequently, 50 ml of n-heptane refined as already mentioned was introduced into a flask which had beer amply replaced internally by nitrogen, and 0.03 mole, calculated as atomic Mg, of the solid ingredient synthesized as above was admitted thereinto. Then, 0.06 mole of $SiCl_4$ was admitted into the flask at 20° C. over 30 minutes for a 3-hour reaction at 50° C. After completion of the reaction, the reaction product was washed with n-heptane. The titanium content of the product was 4.52 weight %. This was the ingredient (i) for the preparation of the solid component (A).

Fifty (50) g of purified n-heptane was introduced into a flask the inside of which had teen replaced by nitrogen, and 5 g of the ingredient (i) produced in the above, then 0.52 ml of $(CH_3)_3CSi(CH_3)(OC_2H_5)$ as the ingredient (ii), then 0.52 ml of $TiCl_4$ as the optional ingredient (iv) were introduced and then 1.5 g of (ethyl)(n-butyl)-magnesium as the ingredient (iii) were introduced for a 2-hour reaction at 30° C. After completion of the contact, the product was amply washed with n-heptane to produce the component A).

Polymerization of Propylene

Propylene was polymerized under conditions similar to those applied for the polymerization of propylene in Example 1b except that the amount of the component (A) was changed to 20 mg and the polymerization temperature was changed to 70° C.

As a result, the polymer was obtained in a yield of 116.6 g, and found to have an MFR of 6.9 %/10 min., a TI.I of 97.0 weight % and a bulk density 0.47 g/cc.

What is claimed is:

1. A process for producing polyolefins, which comprises:
    contacting an α-olefin with a catalyst thereby polymerizing the same, said catalyst comprising:
    component (A) which is a solid catalyst component obtained by bringing ingredients (i), (ii) and (iii) into contact, wherein
    ingredient (i) is a solid catalytic complex containing titanium, magnesium and a halogen as the essential ingredients, wherein the catalytic complex is a product prepared by:
    (a) bringing a magnesium halide, an electron donor and a titanium-containing compound into contact;
    (b) treating alumina or magnesia with a phosphorus halide compound and bringing this compound into contact with a magnesium halide, an electron donor and a halogen-containing titanium compound;
    (c) bringing a halogen-containing titanium compound and/or a halogen compound of silicon into contact with a solid product which has been obtained by bringing a magnesium halide, a titanium tetraalkoxide and a polymeric silicon compound into contact, the polymeric silicon compound having the formula:

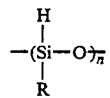

wherein R is a hydrocarbyl radical having about 1-10 carbon atoms, and n denotes the degree of polymerization that permits the viscosity of the polymeric silicon compound to be within the range of about 1-100 centistokes;
    (d) bringing a titanium compound in contact with a solid product which has been obtained by dissolving a magnesium compound in a titanium tetraalkoxide and an electron donor, followed by precipitation with a halogenating agent or a titanium halogen compound;

(e) permitting an organomagnesium compound to act upon a halogenating agent or a reducing agent, then, bringing it into contact with an electron donor and a titanium compound; or (f) bringing a halogenating agent and/or a titanium compound in contact with an alkoxymagnesium compound in the presence or absence of an electron donor;

ingredient (ii) is a silicon compound represented by the formula: $R^1X_nSi(OR^2)_{3-n}$, wherein $R^1$ is a branched-chain hydrocarbyl radical of 4–10 carbon atoms with the carbon atom at its alpha-position being tertiary, X is a halogen atom, $R^2$ is a hydrocarbyl radical of 1–10 carbon atoms and n is $0 \leq n \leq 3$; and ingredient (iii) is an organozinc compound or an organomagnesium compound; and component (B) which is an organoaluminum compound.

2. The process of claim 1, wherein said α-olefin is ethylene, propylene, butene-1, pentene-1, hexene-1 or 1,4-methylpentene.

* * * * *